(12) United States Patent
Chen et al.

(10) Patent No.: US 9,578,180 B2
(45) Date of Patent: Feb. 21, 2017

(54) COMMUNICATION NETWORK SYSTEM, CALLING TERMINAL AND VOICE CALL ESTABLISHING METHOD THEREOF

(71) Applicant: Institute For Information Industry, Taipei (TW)

(72) Inventors: Whai-En Chen, Yilan (TW); Chih-Wei Su, Taipei (TW); Chun-Chieh Chiu, Wujie Township (TW)

(73) Assignee: Institute For Information Industry, Taipei (TW)

( * ) Notice: Subject to any disclaimer, the term of this patent is extended or adjusted under 35 U.S.C. 154(b) by 183 days.

(21) Appl. No.: 13/706,041

(22) Filed: Dec. 5, 2012

(65) Prior Publication Data

US 2013/0148650 A1      Jun. 13, 2013

Related U.S. Application Data

(60) Provisional application No. 61/568,166, filed on Dec. 8, 2011.

(51) Int. Cl.
  *H04L 12/66*  (2006.01)
  *H04M 7/00*  (2006.01)
  *H04L 29/06*  (2006.01)

(52) U.S. Cl.
  CPC ............ *H04M 7/006* (2013.01); *H04L 65/105* (2013.01); *H04L 65/1006* (2013.01); *H04L 65/1069* (2013.01)

(58) Field of Classification Search
  CPC .. H04L 65/1069; H04L 12/66; H04L 65/1016; H04L 65/1006; H04L 67/1097; H04L 69/22; H04L 67/025; H04L 67/125; H04M 7/006; G06F 21/00

(Continued)

(56) References Cited

U.S. PATENT DOCUMENTS 8,185,660 B2    5/2012  Perumal et al.
2005/0066038 A1*  3/2005  Sakamoto ......... H04L 29/06027
                                            709/227

(Continued)

FOREIGN PATENT DOCUMENTS

CN       101068215 A    11/2007
CN       101094182 A    12/2007

(Continued)

OTHER PUBLICATIONS

Office Action to the corresponding Chinese Patent Application No. 201210521079.3 rendered by State Intellectual Property Office (SIPO) on Jun. 26, 2015; 13 pages (including English translation).

*Primary Examiner* — Andrew Chriss
*Assistant Examiner* — Atique Ahmed
(74) *Attorney, Agent, or Firm* — Skaar Ulbrich Macari, P.A.

(57) ABSTRACT

A communication network system, a calling terminal and a voice call establishing method thereof are provided. The communication network system comprises a called terminal, the calling terminal and a session initiation protocol (SIP) server. The calling terminal generates and transmits an invite message including IPv4 connection information and IPv6 connection information of the calling terminal. The SIP server is communicatively connected to the calling terminal and the called terminal. The SIP server receives the invite message from the calling terminal and forwards the invite message to the called terminal. The called terminal establishes a voice call with the calling terminal according to one of the IPv4 connection information and the IPv6 connection information of the calling terminal.

16 Claims, 7 Drawing Sheets

(58) Field of Classification Search
USPC .................. 370/352; 709/208, 228, 245, 227
See application file for complete search history.

(56) References Cited

U.S. PATENT DOCUMENTS

| | | | | |
|---|---|---|---|---|
| 2007/0081545 | A1* | 4/2007 | Lim .................. | H04L 29/12358 370/401 |
| 2008/0075114 | A1* | 3/2008 | Mo .................... | H04L 29/12358 370/466 |
| 2008/0232381 | A1* | 9/2008 | Elwell ............... | H04L 29/06027 370/400 |
| 2008/0247384 | A1* | 10/2008 | Arauz-Rosado .... | H04L 29/1216 370/352 |
| 2009/0319691 | A1* | 12/2009 | Buckley ............ | H04L 29/12349 709/245 |
| 2011/0196975 | A1* | 8/2011 | Horvath ............ | H04L 29/12358 709/228 |
| 2013/0007291 | A1* | 1/2013 | Nickols ........................ | 709/228 |

FOREIGN PATENT DOCUMENTS

| | | | |
|---|---|---|---|
| CN | 101395884 A | 3/2009 | |
| CN | 101395891 A | 3/2009 | |

\* cited by examiner

COMMUNICATION NETWORK SYSTEM, CALLING TERMINAL AND VOICE CALL ESTABLISHING METHOD THEREOF

PRIORITY

This application claims the benefit of priority based on U.S. Provisional Application Ser. No. 61/568,166 filed on Dec. 8, 2011, which is hereby incorporated by reference herein in its entirety.

FIELD

The present invention relates to a communication network system, a calling terminal and a voice call establishing method thereof. More particularly, the communication network system of the present invention comprises a called terminal, a calling terminal and an SIP (Session Initiation Protocol) server. The calling terminal transmits an invite message, which includes IPv4 (Internet Protocol version 4) connection information and IPv6 (Internet Protocol version 6) connection information of the calling terminal, to the called terminal via the SIP message so that the called terminal establishes a voice call with the calling terminal according to one of the IPv4 connection information and the IPv6 connection information of the calling terminal.

BACKGROUND

As the Internet technologies become developed and popularized increasingly, the network applications become more and more diversified. In recent years, owing to development of the overall network environment, the Voice over Internet Protocol (VoIP) service has become one of the important network applications gradually.

Terminals establish voice calls with each other by registering with an SIP (Session Initiation Protocol) server and making and receiving calls according to each other's IP addresses. As IPv4 (Internet Protocol version 4) addresses become exhausted gradually, some of the terminals now begin to be assigned with both an IPv4 address and an IPv6 (Internet Protocol version 6) address. However, assignment of IPv6 addresses is still not so widespread. Therefore, even if a calling terminal has both an IPv4 address and an IPv6 address, it still can not be guaranteed that the called terminal also has both an IPv4 address and an IPv6 address. Furthermore, the calling terminal only knows an identification (ID) code (e.g., a user name, a network telephone number etc.) of the called terminal but doesn't know whether the called terminal is assigned with both the IPv4 address and the IPv6 address.

As the calling terminal certainly will try to use the IPv6 address thereof firstly to make a call, a problem will arise if the called terminal has only an IPv4 address. In view of this, the following solution has been proposed in the prior art (see Whai-En Chen, Quincy Wu, Yi-Bing Lin and Yung-Chieh Lo: 'Design of SIP Application Level Gateway for IPv6 Translation', Journal of Internet Technology, 2004, Vol. 5 No. 2, pp. 147-154; and Yang Xia, Bu Sung Lee, Chai Kiat Yeo, Vincent Lim Sok Seng: 'An IPv6 Translation Scheme for Small and Medium Scale Deployment', Advance in Future Internet (AFIN), July 2010): by use of the Application Layer Gateway (ALG) technology, transformation between the IPv6 address and the IPv4 address included in messages and voice data is carried out by the SIP server so that the calling terminal can use the IPv6 address thereof to make a call to the called terminal and the called terminal can use the IPv4 address thereof to receive the call from the calling terminal.

Besides the aforesaid solution, a redirection technology has also been proposed in the prior art (see Mulahusic J, Person H.: 'SIP issue in dual-stock environment', Internet-Draft, draft-person-sipping-sip-issue-dual-stack-00, February 2003). According to the redirection technology, the SIP server which has received the invite message transmitted by the calling terminal determines whether the called terminal is assigned with an IPv6 address. If the called terminal is not assigned with an IPv6 address, then a specific message is transmitted to inform the calling terminal of this so that the calling terminal changes to use the IPv4 address thereof instead.

Furthermore, the following solution has also been proposed in the prior art (see Whai-En Chen, Ya-Lin Huang, Yi-Bing Lin: 'An effective IPv4-IPv6 translation mechanism for SIP applications in next generation network, Int. J. Communication System, 2012, 23(8), pp. 919-928): by use of the Call Session Control Function technology, the SIP server which has received the invite message transmitted by the calling terminal determines whether the called terminal is assigned with an IPv6 address. If the called terminal is not provided with an IPv6 address, then the IPv6 information included in the invite message is transformed into IPv4 information so that the called terminal establishes a voice call with the calling terminal according to the IPv4 information. However, because the aforesaid three prior art solutions all require the SIP server to transform or coordinate between the IPv4 information and the IPv6 information, an increased burden of the SIP server and a transmission delay will be caused.

Accordingly, an urgent need exists in the art to provide a mechanism of establishing a voice call which can effectively reduce the burden of the SIP server and avoid the transmission delay.

SUMMARY

An objective of the present invention is to provide a communication network system, a calling terminal and a voice call establishing method thereof. The communication network system according to certain embodiments of the present invention comprises a called terminal, a calling terminal and an SIP (Session Initiation Protocol) server. The calling terminal can transmit an invite message including IPv4 (Internet Protocol version 4) connection information and IPv6 (Internet Protocol version 6) connection information of the calling terminal so that the called terminal establishes a voice call with the calling terminal according to one of the IPv4 connection information and the IPv6 connection information of the calling terminal. Thus, the SIP server only needs to forward the messages between the calling terminal and the called terminal without the need of transforming the IPv6 address into the IPv4 address, determining whether the called terminal is assigned with the IPv6 address and coordinating the calling terminal to change to use the IPv4 address instead. Thereby, the present invention can effectively reduce the burden of the SIP server and avoid the transmission delay.

To achieve the aforesaid objective, the present invention discloses a communication network system, which, in certain embodiments, comprises a called terminal, a calling terminal and an SIP server. The calling terminal is configured to generate and transmit an invite message including IPv4 connection information and IPv6 connection information of the calling terminal. The SIP server is communicatively connected to the called terminal and the calling terminal, and is configured to receive the invite message from the calling terminal and forward the invite message to the called terminal. The called terminal establishes a voice call with the calling terminal according to one of the IPv4 connection information and the IPv6 connection information of the calling terminal.

Furthermore, the present invention further discloses a voice call establishing method for a communication network system. The communication network system according to certain embodiments comprises a called terminal, a calling terminal and an SIP server. The SIP server is communicatively connected to the called terminal and the calling terminal. The voice call establishing method comprises the following steps of: enabling the calling terminal to generate and transmit an invite message to the SIP server, the invite message including IPv4 connection information and IPv6 connection information of the calling terminal; enabling the SIP server to forward the invite message to the called terminal; and enabling the called terminal to establish a voice call with the calling terminal according to one of the IPv4 connection information and the IPv6 connection information of the calling terminal.

Furthermore, the present invention further discloses a calling terminal for a communication network system, which, according to certain embodiments, comprises a transceiver and a processor. The communication network system comprises a called terminal, the calling terminal and an SIP server. The SIP server is communicatively connected to the called terminal and the calling terminal. The processor is configured to generate an invite message and transmit the invite message via the transceiver to the SIP server so that the SIP server forwards the invite message to the called terminal. The invite message includes IPv4 connection information and IPv6 connection information of the calling terminal so that the called terminal establishes a voice call with the calling terminal according to one of the IPv4 connection information and the IPv6 connection information of the calling terminal.

Furthermore, the present invention further discloses a voice call establishing method for a calling terminal. The calling terminal is used in a communication network system. The communication network system according to certain embodiments comprises a called terminal, the calling terminal and an SIP server. The SIP server is communicatively connected to the called terminal and the calling terminal. The calling terminal comprises a transceiver and a processor. The voice call establishing method is executed by the processor and comprises the following steps of: generating an invite message, the invite message including IPv4 connection information and IPv6 connection information of the calling terminal; and transmitting the invite message via the transceiver to the SIP server which then forwards the invite message to the called terminal so that the called terminal establishes a voice call with the calling terminal according to one of the IPv4 connection information and the IPv6 connection information of the calling terminal.

The detailed technology and preferred embodiments implemented for the subject invention are described in the following paragraphs accompanying the appended drawings for people skilled in this field to well appreciate the features of the claimed invention.

DETAILED DESCRIPTION

In the following descriptions, the present invention will be explained with reference to example embodiments thereof. It shall be appreciated that, these example embodiments are not intended to limit the present invention to any specific examples, embodiments, environments, applications or particular implementations described in these example embodiments. Therefore, description of these embodiments is only for purpose of illustration rather than to limit the present invention, and the scope claimed in this application shall be governed by the claims. In addition, in the following embodiments and the attached drawings, elements not directly related to the present invention are omitted from depiction; and dimensional relationships among individual elements in the attached drawings are illustrated only for ease of understanding but not to limit the actual scale.

Figure 1:
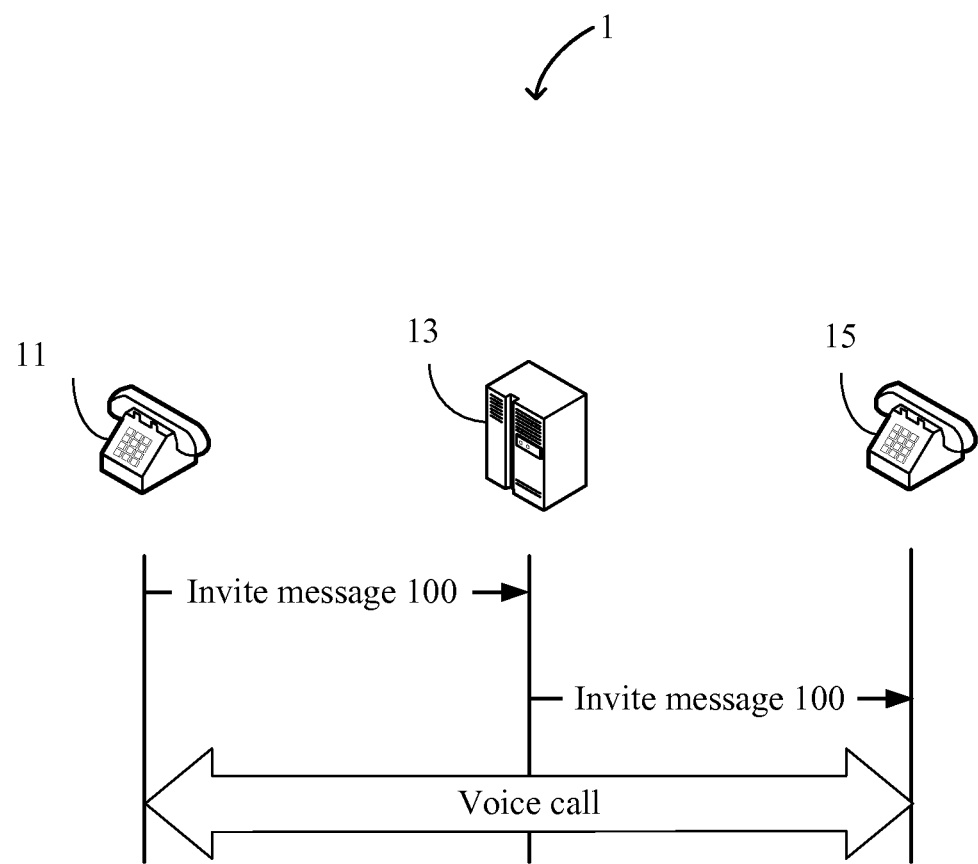
FIG. 1 is a schematic view illustrating a communication network system 1 and message transmissions thereof according to a first embodiment of the present invention.

A first embodiment of the present invention is as shown in FIG. 1, which is a schematic view illustrating a communication network system 1 and message transmissions thereof. The communication network system 1 comprises a calling terminal 11, an SIP (Session Initiation Protocol) server 13 and a called terminal 15. The SIP server 13 is communicatively connected to the calling terminal 11 and the called terminal 15 via the Internet.

When the calling terminal 11 is to make a voice call with the called terminal 15, the calling terminal 11 generates and transmits an invite message 100 to the SIP server 13. The invite message 100 includes IPv4 (Internet Protocol version 4) connection information and IPv6 (Internet Protocol version 6) connection information of the calling terminal 11. The IPv4 connection information and the IPv6 connection information of the calling terminal 11 are recorded in an SDP (Session Description Protocol) content of the invite message 100.

The SIP server 13 receives and then forwards the invite message 100 to the called terminal 15. Then, the called terminal 15 establishes a voice call with the calling terminal 11 according to one of the IPv4 connection information and the IPv6 connection information of the calling terminal 11 (i.e., transmits a voice packet of the Real-time Transport Protocol (RTP)). As can be known from this, the SIP server 13 of the present invention is different from the prior art in that, the SIP server 13 only needs to forward the invite message 100, which is received from the calling terminal 11, to the called terminal 15 without the need of transforming the IPv6 address into the IPv4 address, determining whether the called terminal 15 is assigned with the IPv6 address and coordinating the calling terminal 11 to change to use the IPv4 address instead.

In detail, the called terminal 15 reads from the SDP content of the invite message 100 firstly the IPv4 connection information of the calling terminal 11 and then the IPv6 connection information of the calling terminal 11. If the called terminal 15 is assigned with an IPv4 address and an IPv6 address, then the called terminal 15 uses the IPv6 address thereof to receive the call from the calling terminal 11, so the calling terminal 11 and the called terminal 15 can establish a voice call according to each other's IPv6 address. Otherwise, if the called terminal 15 is assigned with only an IPv4 address, then the called terminal 15 uses the IPv4 address thereof to receive the call from the calling terminal 11, so an RTP voice packet can be transmitted between the calling terminal 11 and the called terminal 15 according to each other's IPv4 address.

In other words, if the called terminal 15 is assigned with an IPv4 address and an IPv6 address, the called terminal 15 can read the IPv6 connection information of the calling terminal 11 in the SDP content and, then, can use the IPv6 address thereof to receive the call from the calling terminal 11. However, if the called terminal 15 is assigned with only an IPv4 address, the called terminal 15 can only read the IPv4 connection information of the calling terminal 11 in the SDP content, in which case the called terminal 15 can only use the IPv4 address thereof to receive the call from the calling terminal 11. Furthermore, the IPv4 connection information and the IPv6 connection information in the SDP content comprise "media description, name and address (m)" and "connection information (c)".

For example, the SDP content may have the following four implementations, where a parameter "audio" represents that the medium is voice, a parameter "auto_media_port" represents a transmission port, a parameter "RTP/AVP (audio/video profile) 8" represents a format of the medium, a parameter "IN" represents the Internet, a parameter "IP6" represents the IPv6 format, "media_ipv6" represents the IPv6 address, "IP4" represents the IPv4 format, "media_ipv4" represents the IPv4 address, and the fourth implementation is the most preferred implementation.

First Implementation
m=audio [auto_media_port] RTP/AVP 8
c=IN IP6 [media_ipv6]
c=IN IP4 [media_ipv4]
Second Implementation
m=audio [auto_media_port] RTP/AVP 8
c=IN IP4 [media_ipv4]
c=IN IP6 [media_ipv6]
Third Implementation
m=audio [auto_media_port] RTP/AVP 8
c=IN IP6 [media_ipv6]
m=audio [auto_media_port] RTP/AVP 8;
c=IN IP4 [media_ipv4]
Fourth Implementation
m=audio [auto_media_port] RTP/AVP 8
c=IN IP4 [media_ipv4]
m=audio [auto_media_port] RTP/AVP 8;
c=IN IP6 [media_ipv6]

It shall be appreciated that, the scope of the present invention is not limited to establish a voice call, but further includes establishments of a video call and a multimedia communication connection. Based on the above explanation, those of ordinary skill in the art can readily appreciate how to modify the parameters of the IPv4 connection information and the IPv6 connection information in the SDP content so as to achieve the purpose of establishing a video call and a multimedia communication connection. Therefore, it will not be further described herein.

Figure 2:
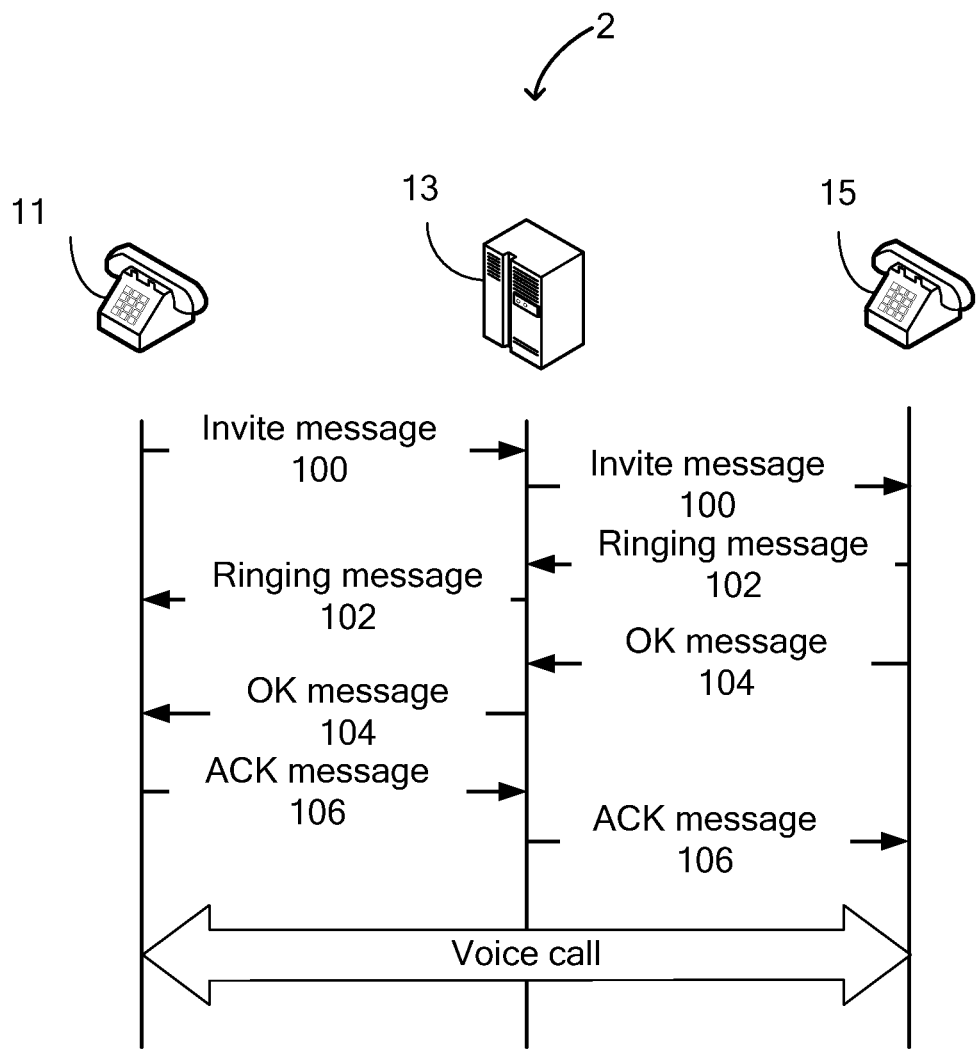
FIG. 2 is a schematic view illustrating a communication network system 2 and message transmissions thereof according to a second embodiment of the present invention.

A second embodiment of the present invention is as shown in FIG. 2, which is a schematic view illustrating a communication network system 2 and message transmissions thereof. In this embodiment, the called terminal 15 further generates and transmits a ringing message 102 to the SIP server 13 according to the IPv4 connection information and the IPv6 connection information of the calling terminal 11 after receiving the invite message 100, and generates and transmits an OK message 104 to the SIP server 13 after receiving the call.

If the called terminal 15 is assigned with only an IPv4 address, then one of the ringing message 102 and the OK message 104 includes IPv4 connection information of the called terminal 15 (i.e., the IPv4 connection information of the called terminal 15 is recorded in an SDP content of the ringing message 102 or the OK message 104). Subsequently, the SIP server 13 forwards the ringing message 102 and the OK message 104 to the calling terminal respectively. Then, the calling terminal 11 generates and transmits an Acknowledgement (ACK) message 106 to the SIP server 13 according to the OK message 104.

According to the IPv4 connection information of the called terminal 15 included in the ringing message 102 or the OK message 104, the calling terminal 11 generates and transmits the ACK message 106. Upon receiving the ACK message 106, the SIP server forwards the ACK message 106 to the called terminal 15. Thereby, the voice call is established between the calling terminal 11 that uses the IPv4 connection information of the called terminal 15 and the called terminal 15 that uses the IPv4 connection information of the calling terminal 11.

On the other hand, if the called terminal 15 is assigned with both an IPv4 address and an IPv6 address, then one of the ringing message 102 and the OK message 104 includes IPv6 connection information of the called terminal 15. Subsequently, the SIP server 13 forwards the ringing message 102 and the OK message 104 to the calling terminal 11 respectively. Then, the calling terminal 11 generates and transmits an ACK message 106 to the SIP server 13 according to the OK message 104.

In response to the IPv6 connection information of the called terminal 15 included in the ringing message 102 or the OK message 104, the calling terminal 11 generates and transmits the ACK message 106. Upon receiving the ACK message 106, the SIP server forwards the ACK message 106 to the called terminal 15. Thereby, the voice call is established between the calling terminal 11 that uses the IPv6 connection information of the called terminal 15 and the called terminal 15 that uses the IPv6 connection information of the calling terminal 11.

Figure 3:
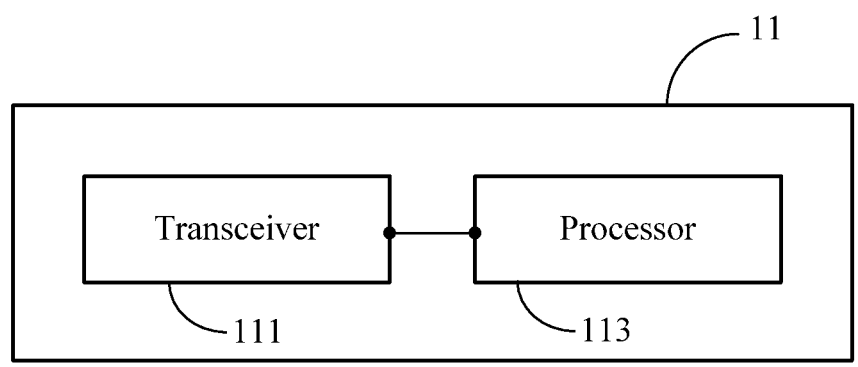
FIG. 3 is a schematic view illustrating a calling terminal 11 according to a third embodiment of the present invention.

A third embodiment of the present invention is as shown in FIG. 3, which is a schematic view illustrating a calling terminal 11 for a communication network system. The calling terminal 11 is suitable for use in the communication network system 1 of the first embodiment and the communication network system 2 of the second embodiment.

The calling terminal 11 comprises a transceiver 111 and a processor 113. In the communication network system 1, the processor 113 is configured to generate the invite message 100 and transmit the invite message 100 to the SIP server 13 via the transceiver 111 so that the SIP server 13 forwards the invite message 100 to the called terminal 15.

In the communication network system 2, the transceiver 111 is configured to receive the ringing message 102 and the OK message 104 from the SIP server 13. The processor 113 is configured to generate the ACK message 106 according to the OK message 104 and transmit the ACK message 106 to the SIP server 13 via the transceiver 111.

Figure 4:
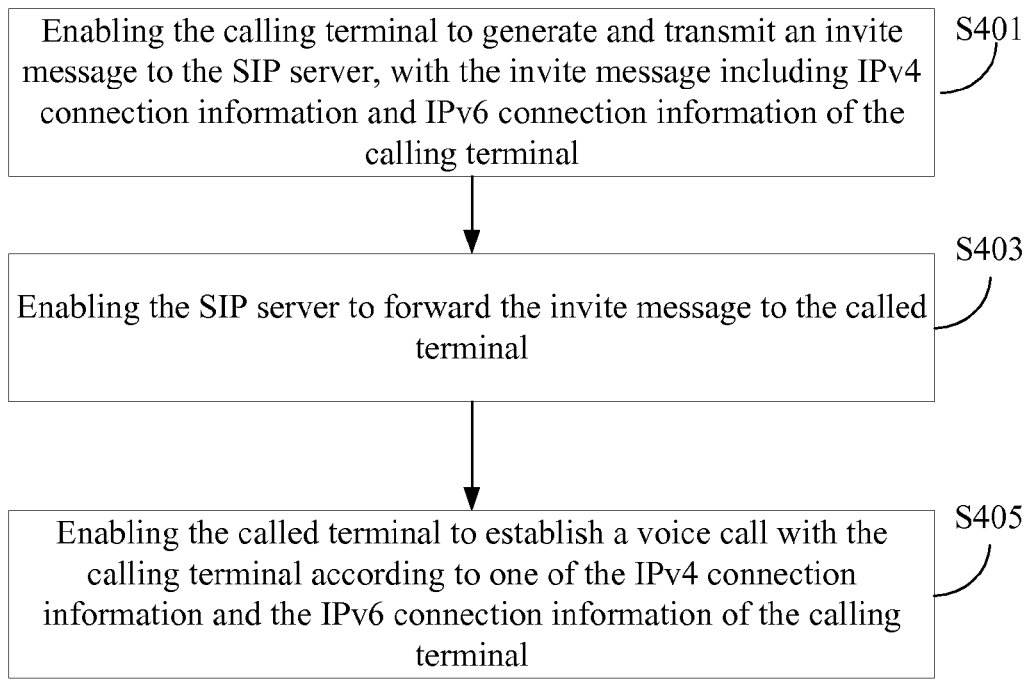
FIG. 4 is a flowchart diagram of a voice call establishing method according to a fourth embodiment of the present invention.

A fourth embodiment of the present invention is as shown in FIG. 4, which is a flowchart diagram of a voice call establishing method. The voice call establishing method of this embodiment can be used in a communication network system (e.g., the communication network system 1 of the first embodiment). The communication network system comprises a called terminal, a calling terminal and an SIP server. The SIP server is communicatively connected to the called terminal and the calling terminal.

Firstly, step S401 is executed to enable the calling terminal to generate and transmit an invite message to the SIP server. The invite message includes IPv4 connection information and IPv6 connection information of the calling terminal. Then, step S403 is executed to enable the SIP server to forward the invite message to the called terminal. Finally, step S405 is executed to enable the called terminal to establish a voice call with the calling terminal according to one of the IPv4 connection information and the IPv6 connection information of the calling terminal.

In addition to the aforesaid steps, the voice call establishing method of this embodiment can also execute all the operations set forth in the first embodiment and accomplish all the corresponding functions. How the voice call establishing method of this embodiment executes these operations and accomplishes these functions can be readily appreciated by those of ordinary skill in the art based on the explanation of the first embodiment, and thus will not be further described herein.

Figure 5:
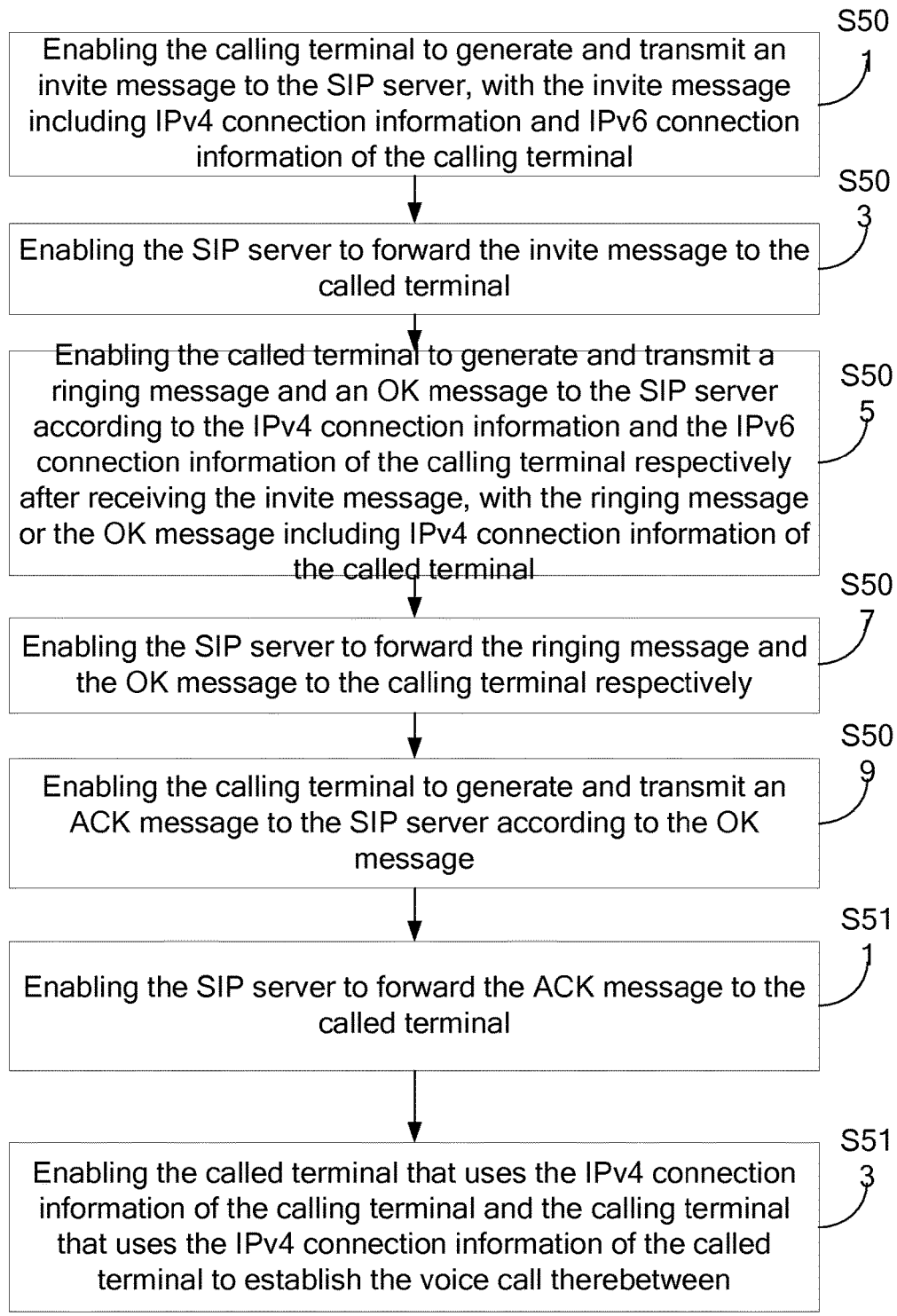
FIG. 5 is a flowchart diagram of a voice call establishing method according to a fifth embodiment of the present invention.

A fifth embodiment of the present invention is as shown in FIG. 5, which is a flowchart diagram of a voice call establishing method. The voice call establishing method of this embodiment can be used in a communication network system (e.g., the communication network system 2 of the second embodiment). The communication network system comprises a called terminal, a calling terminal and an SIP server. The SIP server is communicatively connected to the called terminal and the calling terminal.

Firstly, step S501 is executed to enable the calling terminal to generate and transmit an invite message to the SIP server. The invite message includes IPv4 connection information and IPv6 connection information of the calling terminal. Step S503 is executed to enable the SIP server to forward the invite message to the called terminal. Then, step S505 is executed to enable the called terminal to generate and transmit a ringing message and an OK message to the SIP server according to the IPv4 connection information and the IPv6 connection information of the calling terminal respectively after receiving the invite message, with the ringing message or the OK message including IPv4 connection information of the called terminal. Step S507 is executed to enable the SIP server to forward the ringing message and the OK message to the calling terminal respectively.

Subsequently, step S509 is executed to enable the calling terminal to generate and transmit an ACK message to the SIP server according to the OK message. Step S511 is executed to enable the SIP server to forward the ACK message to the called terminal. Finally, step S513 is executed to enable the called terminal that uses the IPv4 connection information of the calling terminal and the calling terminal that uses the IPv4 connection information of the called terminal to establish the voice call therebetween.

In addition to the aforesaid steps, the voice call establishing method of this embodiment can also execute all the operations set forth in the second embodiment and accomplish all the corresponding functions. How the voice call establishing method of this embodiment executes these operations and accomplishes these functions can be readily appreciated by those of ordinary skill in the art based on the explanation of the second embodiment, and thus will not be further described herein.

Figure 6:
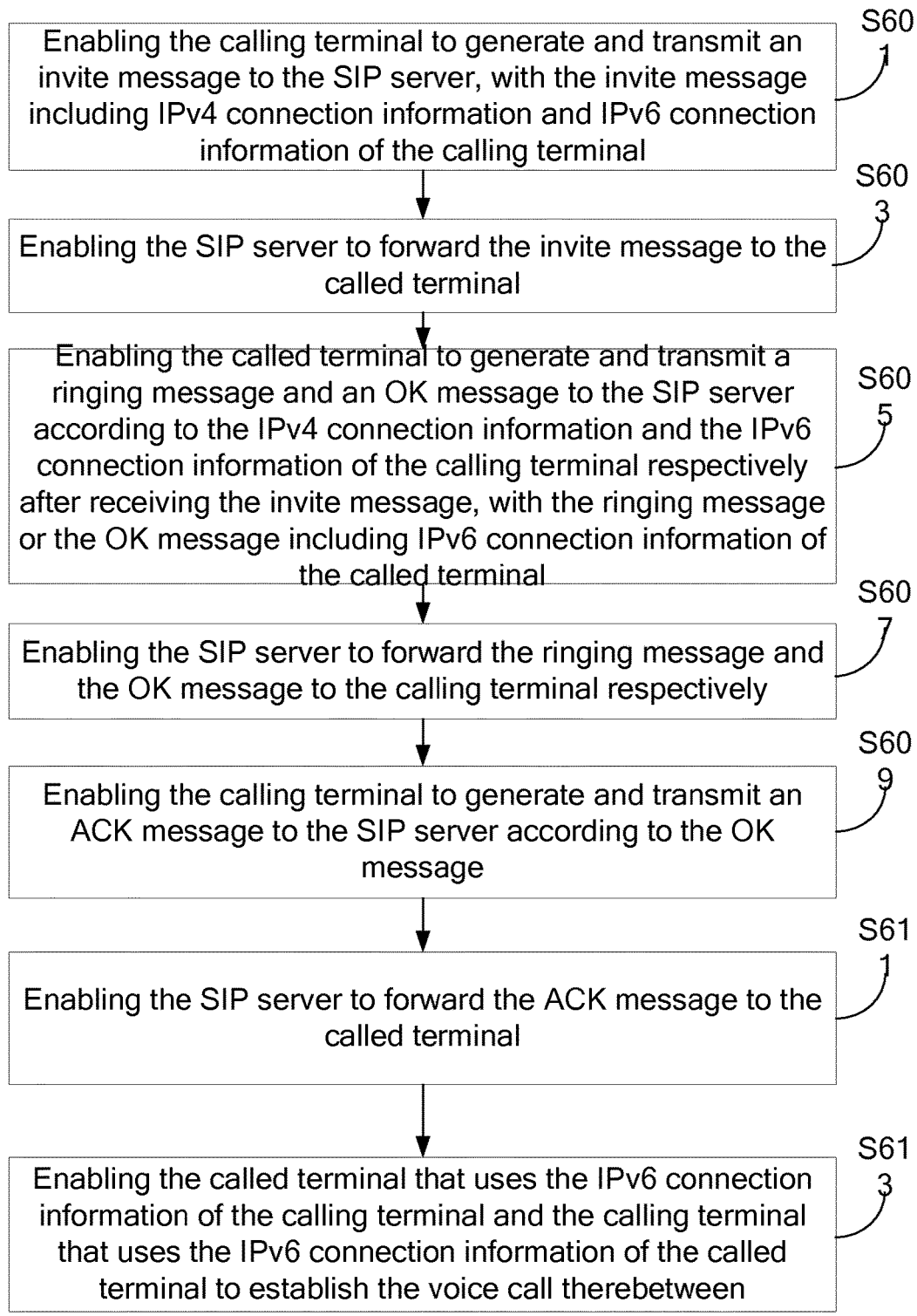
FIG. 6 is a flowchart diagram of a voice call establishing method according to a sixth embodiment of the present invention.

A sixth embodiment of the present invention is as shown in FIG. 6, which is a flowchart diagram of a voice call establishing method. The voice call establishing method of this embodiment can be used in a communication network system (e.g., the communication network system 2 of the second embodiment). The communication network system comprises a called terminal, a calling terminal and an SIP server. The SIP server is communicatively connected to the called terminal and the calling terminal.

Firstly, step S601 is executed to enable the calling terminal to generate and transmit an invite message to the SIP server. The invite message includes IPv4 connection information and IPv6 connection information of the calling terminal. Step S603 is executed to enable the SIP server to forward the invite message to the called terminal. Then, step S605 is executed to enable the called terminal to generate and transmit a ringing message and an OK message to the SIP server according to the IPv4 connection information and the IPv6 connection information of the calling terminal respectively after receiving the invite message, with the ringing message or the OK message including IPv6 connection information of the called terminal. Step S607 is executed to enable the SIP server to forward the ringing message and the OK message to the calling terminal respectively.

Then, step S609 is executed to enable the calling terminal to generate and transmit an ACK message to the SIP server according to the OK message. Step S611 is executed to enable the SIP server to forward the ACK message to the called terminal Finally, step S613 is executed to enable the called terminal that uses the IPv6 connection information of the calling terminal and the calling terminal that uses the IPv6 connection information of the called terminal to establish the voice call therebetween.

In addition to the aforesaid steps, the voice call establishing method of this embodiment can also execute all the operations set forth in the second embodiment and accomplish all the corresponding functions. How the voice call establishing method of this embodiment executes these operations and accomplishes these functions can be readily appreciated by those of ordinary skill in the art based on the explanation of the second embodiment, and thus will not be further described herein.

Figure 7:
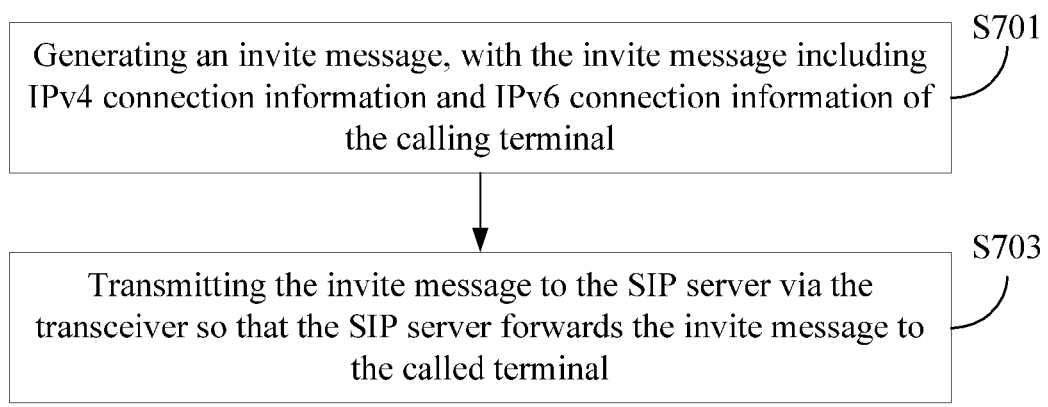
FIG. 7 is a flowchart diagram of a voice call establishing method according to a seventh embodiment of the present invention.

A seventh embodiment of the present invention is as shown in FIG. 7, which is a flowchart diagram of a voice call establishing method. The voice call establishing method of this embodiment can be used in a calling terminal of a communication network system (e.g., the calling terminal 11 of the third embodiment). The communication network system comprises a called terminal, the calling terminal and an SIP server. The SIP server is communicatively connected to the called terminal and the calling terminal. The calling terminal comprises a transceiver and a processor. The processor is electrically connected to the transceiver. The voice call establishing method is executed by the processor.

Firstly, step S701 is executed to generate an invite message. The invite message includes IPv4 connection information and IPv6 connection information of the calling terminal. Then, step S703 is executed to transmit the invite message to the SIP server via the transceiver so that the SIP server forwards the invite message to the called terminal.

In addition to the aforesaid steps, the voice call establishing method of this embodiment can also execute all the operations set forth in the third embodiment and accomplish all the corresponding functions. How the voice call establishing method of this embodiment executes these operations and accomplishes these functions can be readily appreciated by those of ordinary skill in the art based on the explanation of the third embodiment, and thus will not be further described herein.

According to the above descriptions, the calling terminal of the present invention transmits an invite message including IPv4 connection information and IPv6 connection information of the calling terminal so that the called terminal establishes a voice call with the calling terminal according to one of the IPv4 connection information and the IPv6 connection information of the calling terminal. Thereby, the SIP server only needs to forward the messages between the calling terminal and the called terminal, and this can effectively reduce the burden of the SIP server and avoid the transmission delay.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A communication network system, comprising:
   a called terminal;
   a calling terminal, being configured to generate and transmit an invite message including IPv4 (Internet Protocol version 4) connection information and IPv6 (Internet Protocol version 6) connection information of the calling terminal, the IPv4 connection information having an IPv4 address of the calling terminal, the IPv6 connection information having an IPv6 address of the calling terminal; and
   an SIP (Session Initiation Protocol) server communicatively connected to the called terminal and the calling terminal, being configured to receive the invite message from the calling terminal and directly forward the invite message to the called terminal;
   wherein the called terminal establishes a voice call with the calling terminal according to one of the IPv4 connection information and the IPv6 connection information of the calling terminal, if the called terminal is assigned with only an IPv4 address, then the called terminal uses the IPv4 address of the called terminal to receive the voice call from the calling terminal, and if the called terminal is assigned with the IPv4 address and an IPv6 address of the called terminal, then the called terminal uses the IPv6 address of the called terminal to receive the voice call from the calling terminal.

2. The communication network system as claimed in claim 1, wherein:
   the called terminal generates and transmits a ringing message and an OK message to the SIP server according to the IPv4 connection information and the IPv6 connection information of the calling terminal respectively after receiving the invite message, the ringing message or the OK message including IPv4 connection information of the called terminal;
   the SIP server forwards the ringing message and the OK message to the calling terminal respectively;
   the calling terminal generates and transmits an ACK message to the SIP server according to the OK message;
   the SIP server directly forwards the ACK message to the called terminal; and
   the voice call is established between the called terminal that uses the IPv4 connection information of the calling terminal and the calling terminal that uses the IPv4 connection information of the called terminal.

3. The communication network system as claimed in claim 1, wherein:
   the called terminal generates and transmits a ringing message and an OK message to the SIP server according to the IPv4 connection information and the IPv6 connection information of the calling terminal respectively after receiving the invite message, the ringing message or the OK message including IPv6 connection information of the called terminal;
   the SIP server forwards the ringing message and the OK message to the calling terminal respectively;
   the calling terminal generates and transmits an ACK message to the SIP server according to the OK message;
   the SIP server forwards the ACK message to the called terminal; and
   the voice call is established between the called terminal that uses the IPv6 connection information of the calling terminal and the calling terminal that uses the IPv6 connection information of the called terminal.

4. The communication network system as claimed in claim 1, wherein the IPv4 connection information and the IPv6 connection information of the calling terminal are recorded in an SDP (Session Description Protocol) content of the invite message, and the called terminal reads from the SDP content firstly the IPv4 connection information of the calling terminal and then the IPv6 connection information of the calling terminal.

5. A voice call establishing method for a communication network system, the communication network system comprising a called terminal, a calling terminal and an SIP server, and the SIP server being communicatively connected to the called terminal and the calling terminal, the voice call establishing method comprising the following steps of:
   enabling the calling terminal to generate and transmit an invite message to the SIP server, the invite message including IPv4 connection information and IPv6 connection information of the calling terminal, the IPv4 connection information having an IPv4 address of the calling terminal, the IPv6 connection information having an IPv6 address of the calling terminal;
   enabling the SIP server to directly forward the invite message to the called terminal; and
   enabling the called terminal to establish a voice call with the calling terminal according to one of the IPv4 connection information and the IPv6 connection information of the calling terminal, wherein if the called terminal is assigned with only an IPv4 address, then the called terminal uses the IPv4 address of the called terminal to receive the voice call from the calling terminal, and if the called terminal is assigned with the IPv4 address and an IPv6 address of the called terminal, then the called terminal uses the IPv6 address of the called terminal to receive the voice call from the calling terminal.

6. The voice call establishing method as claimed in claim 5, further comprising the following steps of:
enabling the called terminal to generate and transmit a ringing message and an OK message to the SIP server according to the IPv4 connection information and the IPv6 connection information of the calling terminal respectively after receiving the invite message, the ringing message or the OK message including IPv4 connection information of the called terminal;
enabling the SIP server to forward the ringing message and the OK message to the calling terminal respectively;
enabling the calling terminal to generate and transmit an ACK message to the SIP server according to the OK message;
enabling the SIP server to forward the ACK message to the called terminal; and
enabling the called terminal that uses the IPv4 connection information of the calling terminal and the calling terminal that uses the IPv4 connection information of the called terminal to establish the voice call therebetween.

7. The voice call establishing method as claimed in claim 5, further comprising the following steps of:
enabling the called terminal to generate and transmit a ringing message and an OK message to the SIP server according to the IPv4 connection information and the IPv6 connection information of the calling terminal respectively after receiving the invite message, the ringing message or the OK message including IPv6 connection information of the called terminal;
enabling the SIP server to forward the ringing message and the OK message to the calling terminal respectively;
enabling the calling terminal to generate and transmit an ACK message to the SIP server according to the OK message;
enabling the SIP server to forward the ACK message to the called terminal; and
enabling the called terminal that uses the IPv6 connection information of the calling terminal and the calling terminal that uses the IPv6 connection information of the called terminal to establish the voice call therebetween.

8. The voice call establishing method as claimed in claim 5, wherein the IPv4 connection information and the IPv6 connection information of the calling terminal are recorded in an SDP content of the invite message, the voice call establishing method further comprising the following step of:
enabling the called terminal to read from the SDP content firstly the IPv4 connection information of the calling terminal and then the IPv6 connection information of the calling terminal.

9. A calling terminal for a communication network system, the communication network system comprising a called terminal, the calling terminal and an SIP server, and the SIP server being communicatively connected to the called terminal and the calling terminal, the calling terminal comprising:
a transceiver; and
a processor electrically connected to the transceiver, being configured to generate an invite message and transmit the invite message via the transceiver to the SIP server so that the SIP server directly forwards the invite message to the called terminal;
wherein the invite message includes IPv4 connection information with an IPv4 address of the calling terminal and IPv6 connection information with the IPv6 address of the calling terminal so that the called terminal establishes a voice call with the calling terminal according to one of the IPv4 connection information and the IPv6 connection information of the calling terminal, if the called terminal is assigned with only an IPv4 address, then the called terminal uses the IPv4 address of the called terminal to receive the voice call from the calling terminal, and if the called terminal is assigned with the IPv4 address and an IPv6 address of the called terminal, then the called terminal uses the IPv6 address of the called terminal to receive the voice call from the calling terminal.

10. The calling terminal as claimed in claim 9, wherein:
the called terminal transmits a ringing message and an OK message to the SIP server according to the IPv4 connection information and the IPv6 connection information of the calling terminal respectively after receiving the invite message, the ringing message or the OK message including IPv4 connection information of the called terminal;
the SIP server forwards the ringing message and the OK message to the calling terminal respectively;
the transceiver further receives the ringing message and the OK message from the SIP server;
the processor further generates an ACK message according to the OK message and transmits the ACK message to the SIP server via the transceiver; and
the SIP server forwards the ACK message to the called terminal so that the voice call is established between the called terminal that uses the IPv4 connection information of the calling terminal and the calling terminal that uses the IPv4 connection information of the called terminal.

11. The calling terminal as claimed in claim 9, wherein:
the called terminal transmits a ringing message and an OK message to the SIP server according to the IPv4 connection information and the IPv6 connection information of the calling terminal respectively after receiving the invite message, the ringing message or the OK message including IPv6 connection information of the called terminal;
the SIP server forwards the ringing message and the OK message to the calling terminal respectively;
the transceiver receives the ringing message and the OK message from the SIP server;
the processor generates an ACK message according to the OK message and transmits the ACK message to the SIP server via the transceiver; and
the SIP server forwards the ACK message to the called terminal so that the voice call is established between the called terminal that uses the IPv6 connection information of the calling terminal and the calling terminal that uses the IPv6 connection information of the called terminal.

12. The calling terminal as claimed in claim 9, wherein the IPv4 connection information and the IPv6 connection information of the calling terminal are recorded in an SDP content of the invite message, and the called terminal reads from the SDP content firstly the IPv4 connection information of the calling terminal and then the IPv6 connection information of the calling terminal.

13. A voice call establishing method for a calling terminal, the calling terminal being used in a communication network system, the communication network system comprising a called terminal, the calling terminal and an SIP server, the SIP server being communicatively connected to the called terminal and the calling terminal, and the calling terminal comprising a transceiver and a processor electrically connected to the transceiver, the voice call establishing method being executed by the processor and comprising the following steps of:

generating an invite message, the invite message including IPv4 connection information and IPv6 connection information of the calling terminal, the IPv4 connection information having an IPv4 address of the calling terminal, the IPv6 connection information having an IPv6 address of the calling terminal; and transmitting the invite message via the transceiver to the SIP server which then directly forwards the invite message to the called terminal, wherein the called terminal establishes a voice call with the calling terminal according to one of the IPv4 connection information and the IPv6 connection information of the calling terminal, if the called terminal is assigned with only an IPv4 address, then the called terminal uses the IPv4 address of the called terminal to receive the voice call from the calling terminal, and if the called terminal is assigned with the IPv4 address and an IPv6 address of the called terminal, then the called terminal uses the IPv6 address of the called terminal to receive the voice call from the calling terminal.

14. The voice call establishing method as claimed in claim 13, wherein the called terminal transmits a ringing message and an OK message to the SIP server according to the IPv4 connection information and the IPv6 connection information of the calling terminal respectively after receiving the invite message, the ringing message or the OK message includes IPv4 connection information of the called terminal, and the SIP server forwards the ringing message and the OK message to the calling terminal respectively, the voice call establishing method further comprising the following steps of:

receiving the ringing message and the OK message from the SIP server via the transceiver;

generating an ACK message according to the OK message; and transmitting the ACK message via the transceiver to the SIP server which then forwards the ACK message to the called terminal so that the voice call is established between the called terminal that uses the IPv4 connection information of the calling terminal and the calling terminal that uses the IPv4 connection information of the called terminal.

15. The voice call establishing method as claimed in claim 13, wherein the called terminal transmits a ringing message and an OK message to the SIP server according to the IPv4 connection information and the IPv6 connection information of the calling terminal respectively after receiving the invite message, the ringing message or the OK message includes IPv6 connection information of the called terminal, and the SIP server forwards the ringing message and the OK message to the calling terminal respectively, the voice call establishing method further comprising the following steps of:

receiving the ringing message and the OK message from the SIP server via the transceiver;

generating an ACK message according to the OK message; and transmitting the ACK message via the transceiver to the SIP server which then forwards the ACK message to the called terminal so that the voice call is established between the called terminal that uses the IPv6 connection information of the calling terminal and the calling terminal that uses the IPv6 connection information of the called terminal.

16. The voice call establishing method as claimed in claim 13, wherein the IPv4 connection information and the IPv6 connection information of the calling terminal are recorded in an SDP content of the invite message, and the called terminal reads from the SDP content firstly the IPv4 connection information of the calling terminal and then the IPv6 connection information of the calling terminal.

* * * * *